(12) United States Patent
Nango et al.

(10) Patent No.: US 8,709,672 B2
(45) Date of Patent: Apr. 29, 2014

(54) FUEL CELL MODULE

(75) Inventors: Ayaka Nango, Wako (JP); Tetsuya Ogawa, Wako (JP); Tomoyoshi Kuroishi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 181 days.

(21) Appl. No.: 13/266,750

(22) PCT Filed: Apr. 20, 2010

(86) PCT No.: PCT/JP2010/056993
§ 371 (c)(1),
(2), (4) Date: Oct. 27, 2011

(87) PCT Pub. No.: WO2010/125946
PCT Pub. Date: Nov. 4, 2010

(65) Prior Publication Data
US 2012/0045708 A1    Feb. 23, 2012

(30) Foreign Application Priority Data
Apr. 27, 2009    (JP) .................................. 2009-108051

(51) Int. Cl.
*H01M 8/24*    (2006.01)

(52) U.S. Cl.
USPC ............................ 429/456; 429/469; 429/470

(58) Field of Classification Search
USPC .................................. 429/456, 467, 469, 470
See application file for complete search history.

(56) References Cited

U.S. PATENT DOCUMENTS

| | | | |
|---|---|---|---|
| 7,901,828 B2* | 3/2011 | Inagaki | .......................... 429/469 |
| 2005/0142427 A1 | 6/2005 | Homma | |
| 2006/0110649 A1 | 5/2006 | Nishiyama et al. | |
| 2006/0110650 A1 | 5/2006 | Sugiura et al. | |
| 2008/0152957 A1 | 6/2008 | James et al. | |
| 2009/0263689 A1 | 10/2009 | Homma | |
| 2009/0280370 A1 | 11/2009 | Dan | |

FOREIGN PATENT DOCUMENTS

| | | |
|---|---|---|
| JP | 2002-203588 | 7/2002 |
| JP | 2002-280052 | 9/2002 |
| JP | 2004-164969 | 6/2004 |
| JP | 2005-209621 | 8/2005 |
| JP | 2006-85981 | 3/2006 |
| JP | 2006-179455 | 7/2006 |
| JP | 2007-227059 | 9/2007 |
| JP | 2007-287424 | 11/2007 |
| JP | 2007-311160 | 11/2007 |

(Continued)

OTHER PUBLICATIONS

European Search Report for Application No. 10769645.2, 9 pages, dated Sep. 6, 2012.

*Primary Examiner* — Stephen J. Kalafut
(74) *Attorney, Agent, or Firm* — Nelson Mullins Riley & Scarborough LLP; Anthony A. Laurentano (57) ABSTRACT

In a fuel cell stack constituting a fuel cell module, electrolyte/electrode assemblies and separators are alternately laminated. An electrolyte/electrode assembly and a terminal separator are arranged on one end of the fuel cell stack in the lamination direction in this order outwardly, and a dummy electrolyte/electrode assembly and a terminal separator are arranged on the other end of the fuel cell stack in the lamination direction in this order outwardly. The dummy electrolyte/electrode assembly is so formed as to have the same shape as the electrolyte/electrode assemblies, while having conductivity but not having a power generation function.

6 Claims, 10 Drawing Sheets

(56) References Cited

FOREIGN PATENT DOCUMENTS

| JP | 2008-4299 | 1/2008 |
|---|---|---|
| JP | 2008-41303 | 2/2008 |
| JP | 2008-108656 | 5/2008 |
| JP | 2008-226713 | 9/2008 |
| WO | 2007/136080 A1 | 11/2007 |
| WO | 2008/050885 A1 | 5/2008 |

* cited by examiner

FIG. 1

→ EXHAUST GAS
→ AIR (OXYGEN-CONTAINING GAS)
⇢ FUEL GAS

FUEL CELL MODULE

RELATED APPLICATIONS

This application is a 35 U.S.C. 371 national stage filing of International Application No. PCT/JP2010/056993, filed Apr. 20, 2010, which claims priority to Japanese Patent Application No. 2009-108051 filed on Apr. 27, 2009 in Japan. The contents of the aforementioned applications are hereby incorporated by reference.

TECHNICAL FIELD

The present invention relates to a fuel cell module including a fuel cell stack formed by stacking electrolyte electrode assemblies and separators alternately. Each of the electrolyte electrode assemblies includes an anode, a cathode, and an electrolyte interposed between the anode and the cathode.

BACKGROUND ART

Typically, a solid oxide fuel cell (SOFC) employs an electrolyte of ion-conductive oxide such as stabilized zirconia. The electrolyte is interposed between an anode and a cathode to form an electrolyte electrode assembly (MEA). The electrolyte electrode assembly is interposed between separators (bipolar plates). In use, normally, predetermined numbers of the electrolyte electrode assemblies and the separators are stacked together to form a fuel cell stack.

In the fuel cell stack, since the electrolyte electrode assemblies and the separators are stacked alternately in the vertical direction, in particular, the entire weight of the fuel cell is directly applied to the fuel cell (electrolyte electrode assemblies and separators) provided at the lowermost position of the fuel cell stack. Therefore, the fuel cell at the lowermost position of the fuel cell stack tends to be damaged easily.

Figure 10:
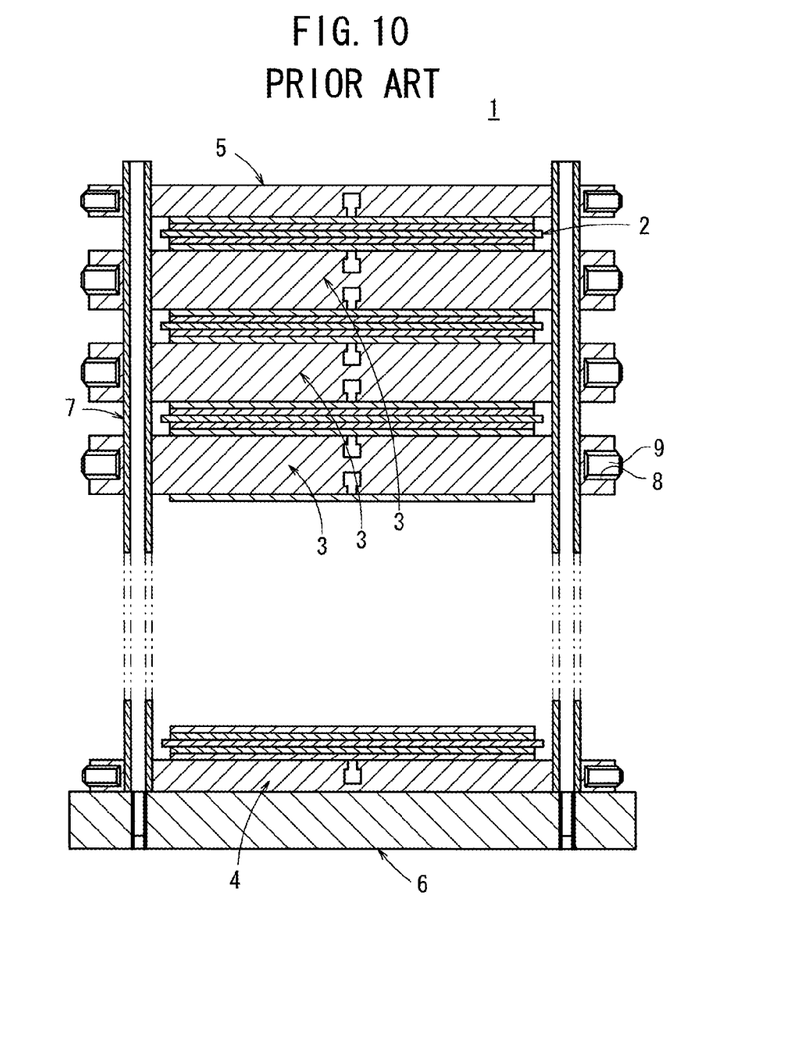
FIG. 10 is a cross sectional view showing a fuel cell disclosed in Japanese Laid-Open Patent Publication No. 2002-280052.

In this regard, for example, structure disclosed in Japanese Laid-Open Patent Publication No. 2002-280052 is known. As shown in FIG. 10, according to the disclosure of Japanese Laid-Open Patent Publication No. 2002-280052, a fuel cell 1 is formed by stacking power generation cells 2 and separators 3 alternately in a vertical direction. A single fuel end plate 4 is stacked at the end of the fuel cell 1 at the lowermost position, and a single air end plate 5 is stacked at the end of the fuel cell 1 at the uppermost position.

The fuel cell 1 is placed on a base plate 6, and connection members 7 are inserted into four corners. Screw holes 8 are formed at four corners of the separator 3, at four corners of the air end plate 5, and at four corners of the fuel end plate 4. Screws 9 are screwed into the screw holes 8, and surface to surface contact is applied between tip ends of the screws 9 and the connection members 7.

In the structure, it is possible to maintain the load applied to the power generation cells 2 at the lower positions of the fuel cell 1 to be substantially the same as the load applied to the other power generation cells 2. According to the disclosure, the load is not applied to the power generation cells 2 excessively, and damages of the power generation cells 2 can be prevented.

SUMMARY OF INVENTION

Since the fuel cell 1 adopts structure where the screw holes 8 are formed at the four corners of the separator 3, the air end plate 5, and the fuel end plate 4, and the screws 9 are screwed into the screw holes 8, the overall structure of the fuel cell 1 is considerably complicated.

The present invention has been made to solve the problem of this type, and an object of the present invention is to provide a fuel cell module having simple and economical structure for a favorable load absorption function in which it is possible to reliably prevent damages or the like of MEAs due to the own weight of the MEAs positioned at ends, reduce the amount of wastefully discharged fuel gas as much as possible, and achieve improvement in the efficiency.

The present invention relates to a fuel cell module including a fuel cell stack formed by stacking electrolyte electrode assemblies and separators alternately in a stacking direction. Each of the electrolyte electrode assemblies includes an anode, a cathode, and an electrolyte interposed between the anode and the cathode. A fuel gas channel for supplying a fuel gas along an electrode surface of the anode is formed on one surface of the separator and an oxygen-containing gas channel for supplying an oxygen-containing gas along an electrode surface of the cathode is formed on the other surface of the separator.

The electrolyte electrode assembly and an end separator are provided at one end of the fuel cell stack in the stacking direction. The end separator is provided outside the electrolyte electrode assembly in the stacking direction. The end separator is configured to limit supply of the fuel gas to the fuel gas channel and to allow supply of the oxygen-containing gas to the oxygen-containing gas channel. Further, a dummy electrolyte electrode assembly and the end separator are provided at another end of the fuel cell stack in the stacking direction. The end separator is provided outside the dummy electrolyte electrode assembly in the stacking direction. The dummy electrolyte electrode assembly has a shape that is similar to that of the electrolyte electrode assembly, has electrical conductivity, but does not have a power generation function.

According to the present invention, at both ends of the fuel cell stack in the stacking direction, the end separators limiting the supply of the fuel gas to the fuel gas channel are respectively provided. Therefore, the fuel gas is not supplied wastefully. In the structure, consumption of the fuel gas is reduced, and the fuel gas can be supplied efficiently.

Further, since the dummy electrolyte electrode assembly and the end separator are provided at the other end of the fuel cell stack in the stacking direction, the load absorption function is effectively improved, and damages of the electrolyte electrode assembly can be prevented as much as possible. Further, since the dummy electrolyte electrode assembly is provided instead of the electrolyte electrode assembly, a heat insulating layer is formed between the dummy electrolyte electrode assembly and the end separator, thereby improving the heat insulating performance in the fuel cell stack.

DESCRIPTION OF EMBODIMENTS

Figure 1:
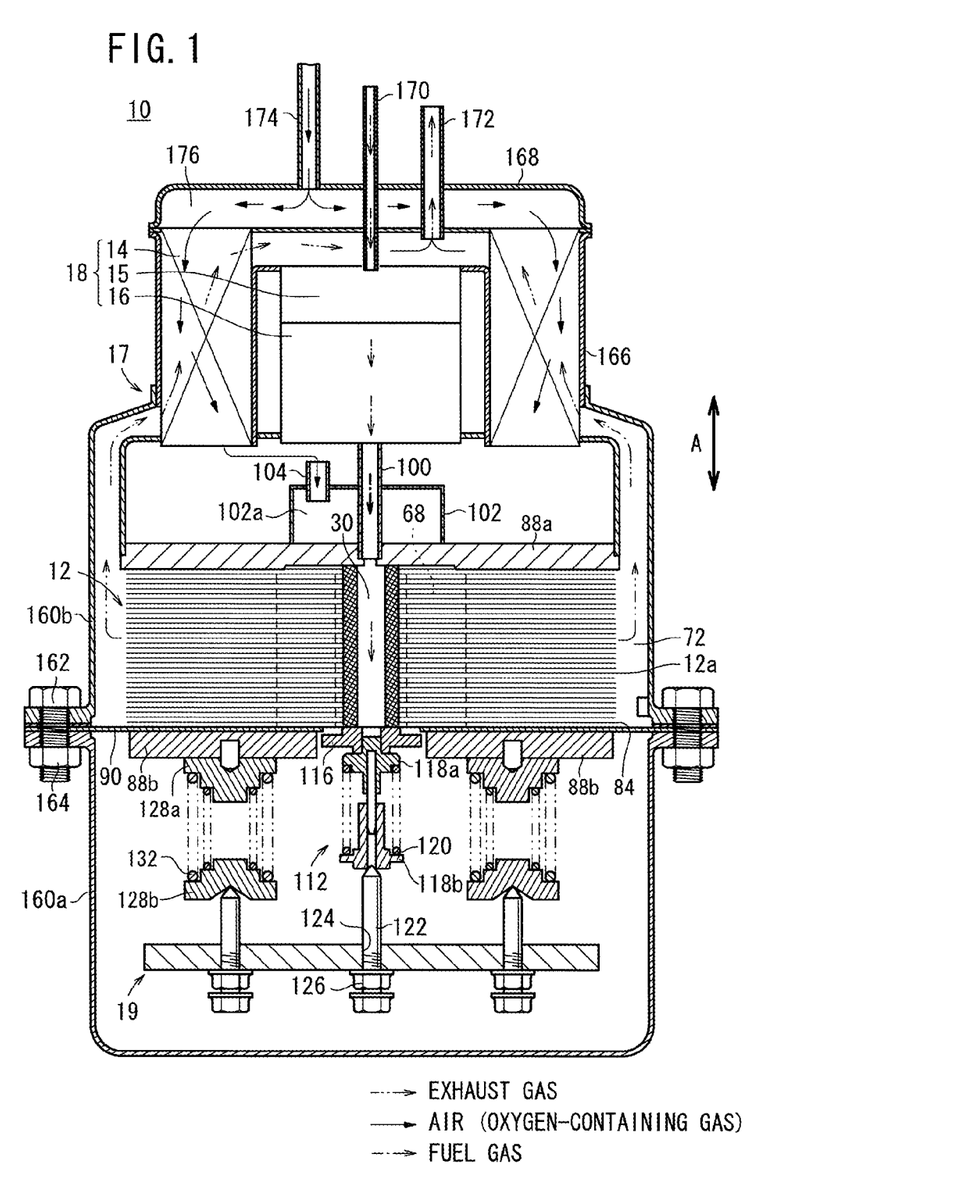
FIG. 1 is a cross sectional view showing a fuel cell module according to a first embodiment of the present invention.
Figure 2:
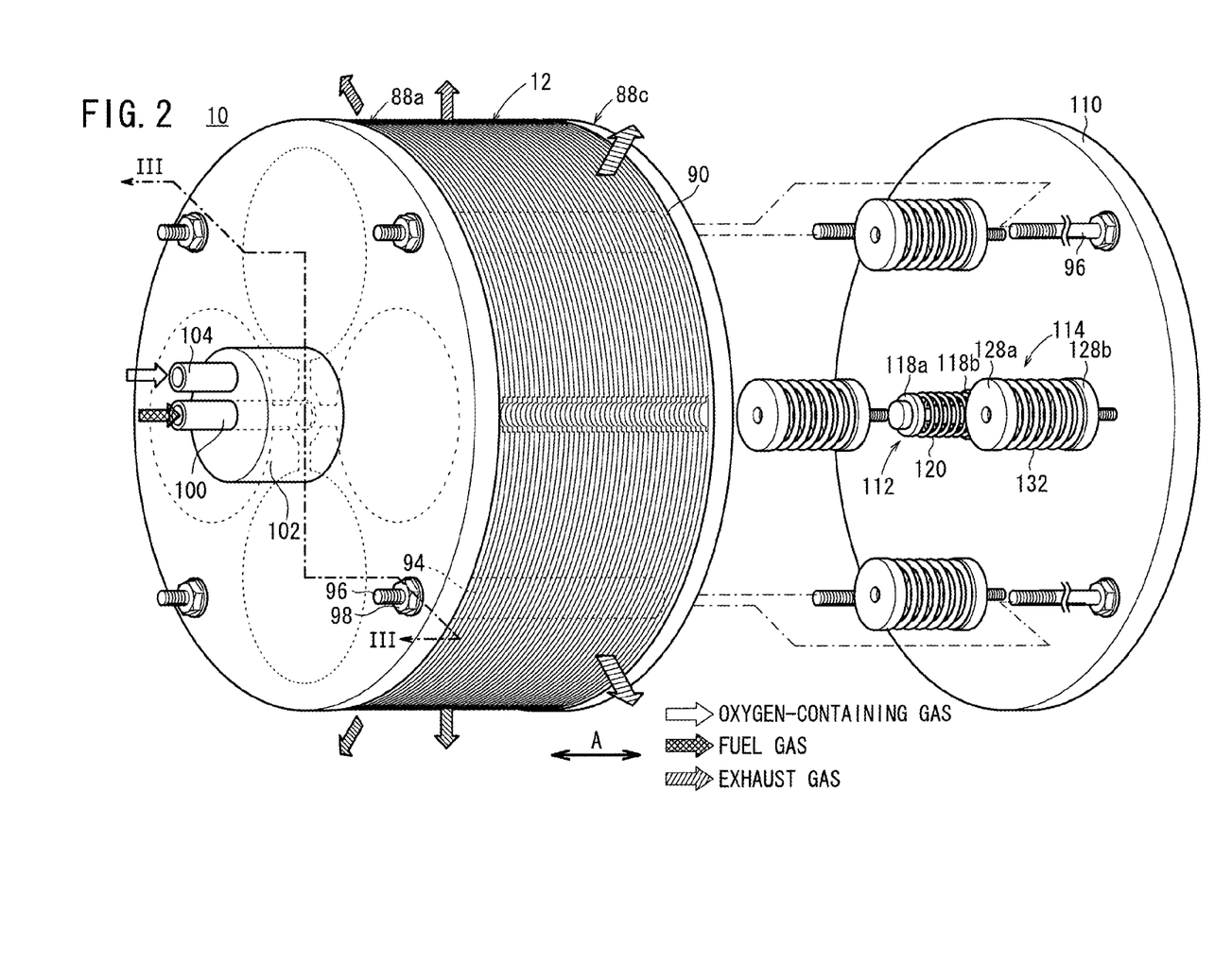
FIG. 2 is a perspective view schematically showing a fuel cell stack of the fuel cell module.
Figure 3:
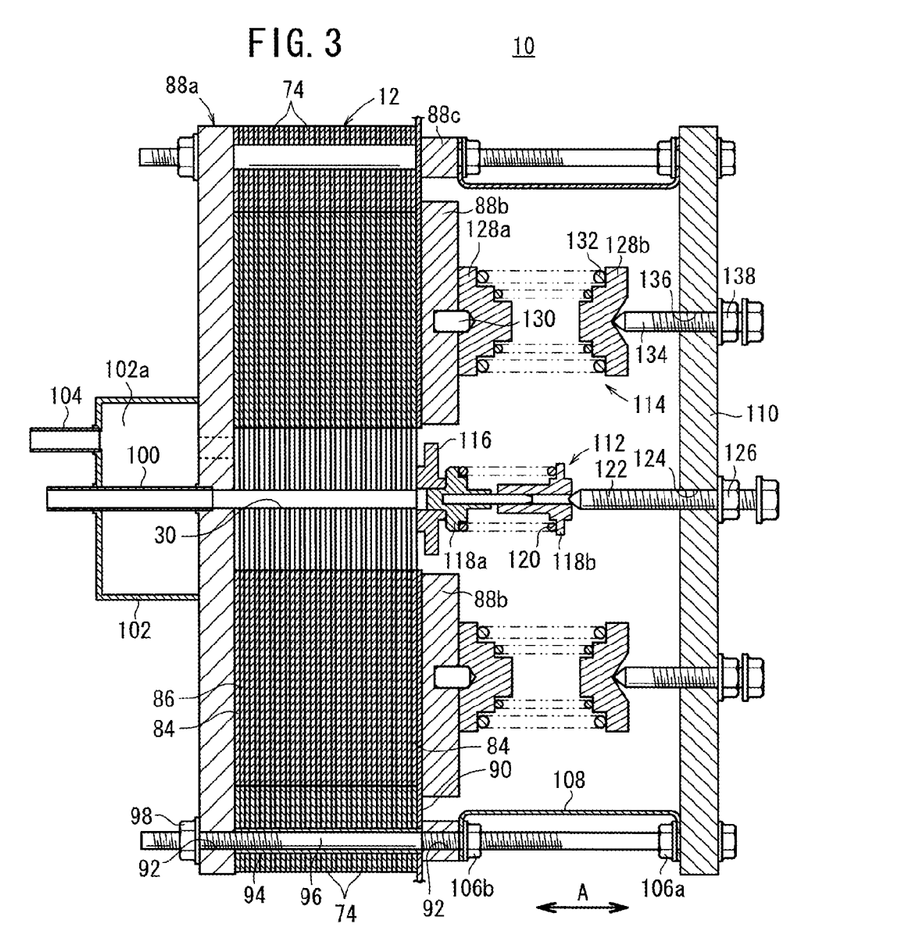
FIG. 3 is a cross sectional view showing the fuel cell stack, taken along a line III-III in FIG. 2.

As shown in FIGS. 1 to 3, a fuel cell module 10 according to a first embodiment of the present invention is used in various applications, including stationary and mobile applications. For example, the fuel cell module 10 is mounted on a vehicle.

The fuel cell module 10 includes a fuel cell stack 12, a heat exchanger 14 for heating the oxygen-containing gas before it is supplied to the fuel cell stack 12, an evaporator 15 for evaporating water to produce a mixed fuel of the raw fuel and the water vapor, a reformer 16 for reforming the mixed fuel to produce a reformed gas, and a casing 17 containing the fuel cell stack 12, the heat exchanger 14, the evaporator 15, the reformer 16, and a load applying mechanism 19 as described later.

The reformer 16 reforms higher hydrocarbons ($C_{2+}$) such as ethane ($C_2H_6$), propane ($C_3H_8$), and butane ($C_4H_{10}$) in the city gas (raw fuel) to produce the fuel gas chiefly containing methane ($CH_4$), hydrogen, and CO by steam reforming as a preliminary reformer, and the reformer 16 is operated at an operating temperature of several hundred degrees Celsius.

In the casing 17, a fluid unit 18 including at least the heat exchanger 14, the evaporator 15, and the reformer 16 is disposed on one side of the fuel cell stack 12, and the load applying mechanism 19 for applying a tightening load in the stacking direction indicated by an arrow A is disposed on the other side of the fuel cell stack 12. The fluid unit 18 and the load applying mechanism 19 are provided symmetrically with respect to the axis of the fuel cell stack 12.

Figure 4:
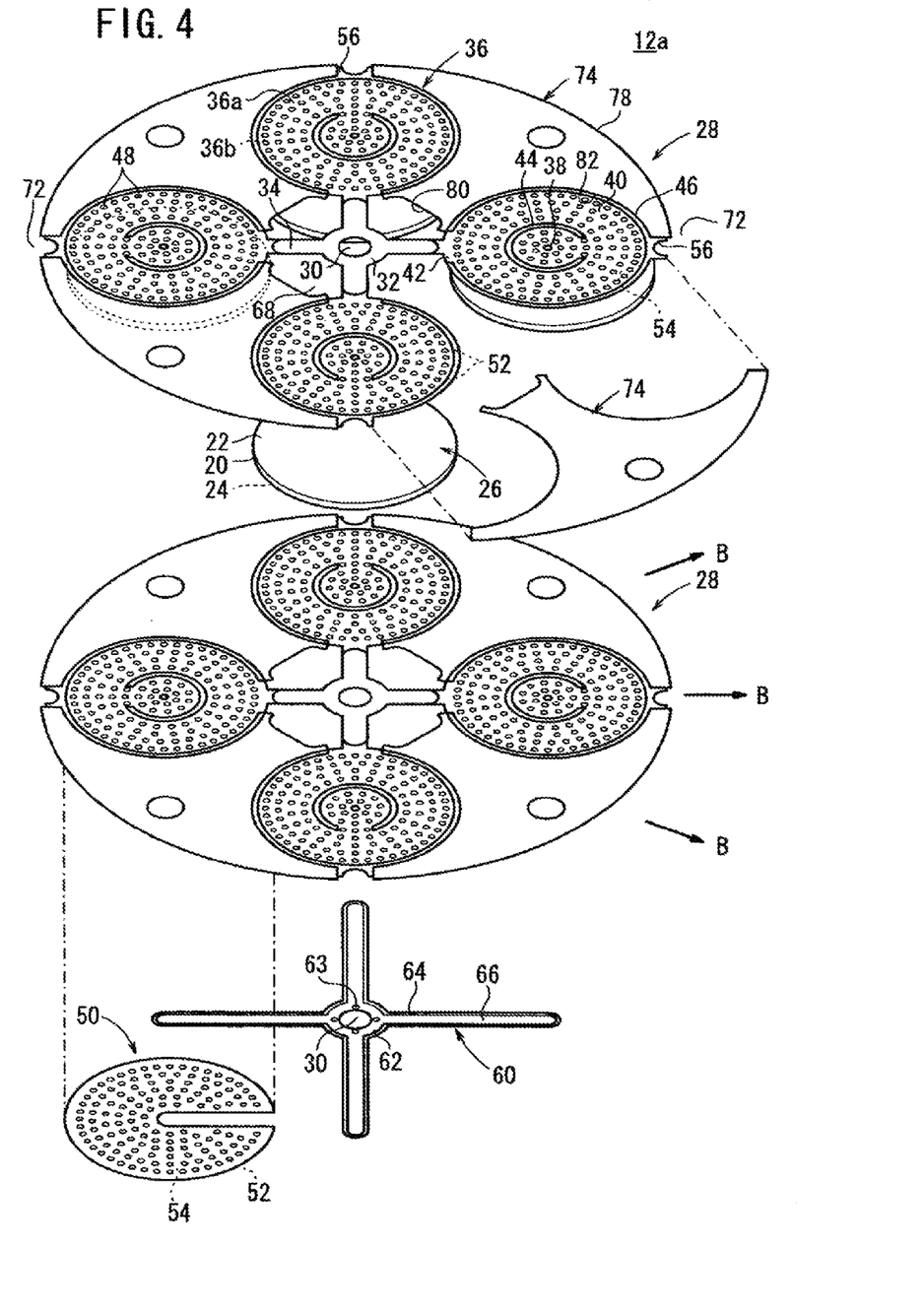
FIG. 4 is an exploded perspective view showing the fuel cell.
Figure 5:
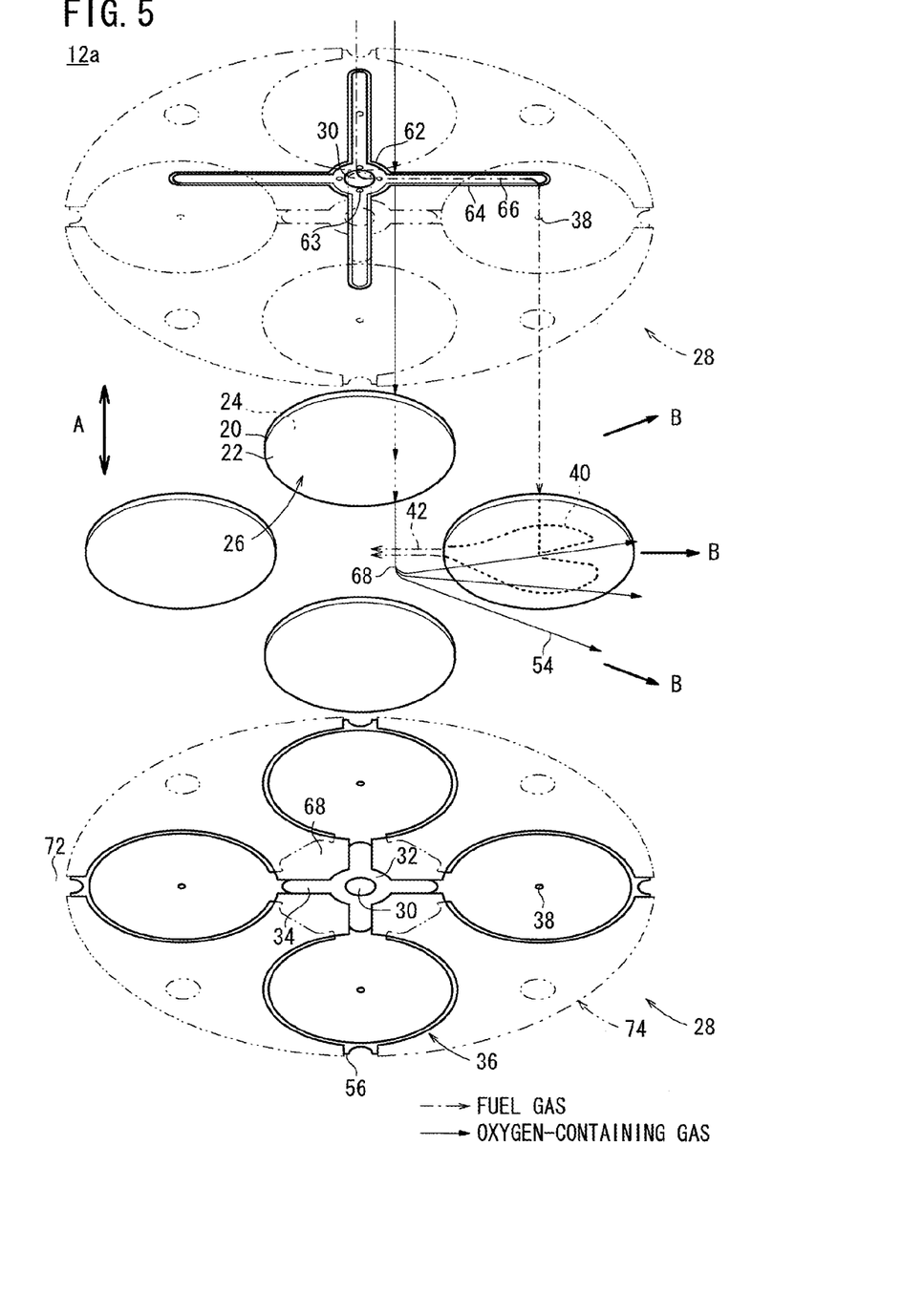
FIG. 5 is a partially exploded perspective view showing gas flows in the fuel cell.

The fuel cell stack 12 includes a plurality of solid oxide fuel cells 12a stacked in the direction indicated by the arrow A. As shown in FIGS. 4 and 5, the fuel cell 12a includes electrolyte electrode assemblies (MEAs) 26. Each of the electrolyte electrode assemblies 26 includes a cathode 22, an anode 24, and an electrolyte (electrolyte plate) 20 interposed between the cathode 22 and the anode 24. For example, the electrolyte 20 is made of ion-conductive oxide such as stabilized zirconia.

The electrolyte electrode assembly 26 has a circular disk shape. A barrier layer (not shown) is provided at least at the outer circumferential edge of the electrolyte electrode assembly 26 for preventing the entry or discharge of the oxygen-containing gas and the fuel gas. Four electrolyte electrode assemblies 26 are sandwiched between a pair of separators 28. The four electrolyte electrode assemblies 26 are provided on a circle concentrically around a fuel gas supply passage 30 extending through the center of the separators 28.

As shown in FIG. 4, each of the separators 28 includes, e.g., one metal plate of stainless alloy etc., or a carbon plate. A fuel gas supply section (reactant gas supply section) 32 is formed at the center of the separator 28, and the fuel gas supply passage 30 extends through the fuel gas supply section 32. Four first bridges 34 extend radially outwardly from the fuel gas supply section 32 at equal intervals, e.g., 90°. The fuel gas supply section 32 is integral with sandwiching sections 36 each having a relatively large diameter, through the first bridges 34. The centers of sandwiching sections 36 are equally distanced from the center of the fuel gas supply section 32.

Each of the sandwiching sections 36 has a circular disk shape, having substantially the same dimensions as the electrolyte electrode assembly 26. The sandwiching sections 36 are separated from each other. A fuel gas inlet 38 for supplying the fuel gas is formed at the center of the sandwiching section 36, or at an upstream position deviated from the center of the sandwiching section 36 in the flow direction of the oxygen-containing gas.

Each of the sandwiching sections 36 has a fuel gas channel 40 on a surface 36a which contacts the anode 24, for supplying a fuel gas along an electrode surface of the anode 24. Further, a fuel gas discharge channel 42 for discharging the fuel gas partially consumed in the fuel gas channel 40 and a circular arc wall 44 forming a detour path to prevent the fuel gas from flowing straight from the fuel gas inlet 38 to the fuel gas discharge channel 42 are provided on the surface 36a.

The circular arc wall 44 has a substantially horseshoe shape. The fuel gas inlet 38 is provided inside the circular arc wall 44, and the fuel gas discharge channel 42 is provided on a proximal end side of the sandwiching section 36, near the first bridge 34. On the surface 36a, a circumferential protrusion 46 and a plurality of projections 48 are provided. The circumferential protrusion 46 protrudes toward the fuel gas channel 40, and contacts the outer edge of the anode 24, and the projections 48 contact the anode 24.

The protrusion 46 has a substantially ring shape with partial cutaway at a position corresponding to the fuel gas discharge channel 42. The projections 48 are made of solid portions formed by, e.g., etching, or hollow portions formed by press forming.

Figure 6:
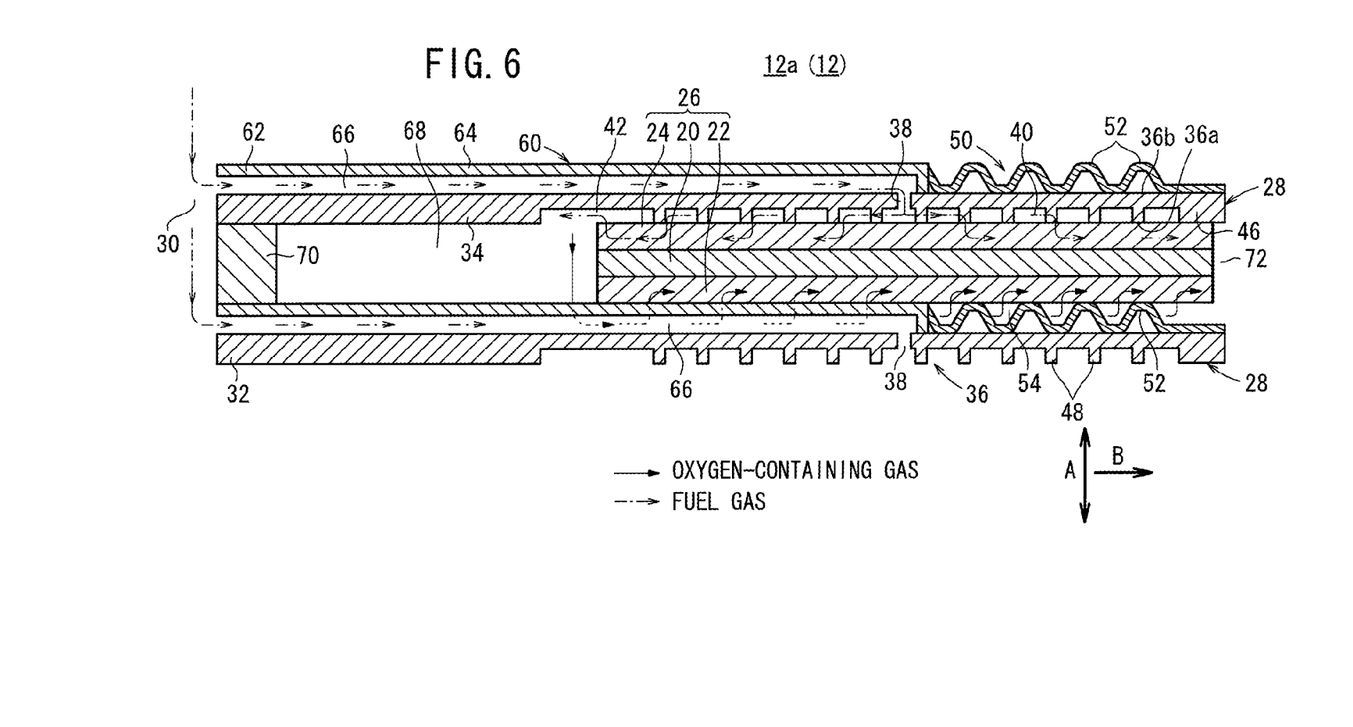
FIG. 6 is a cross sectional view schematically showing operation of the fuel cell.
Figure 7:
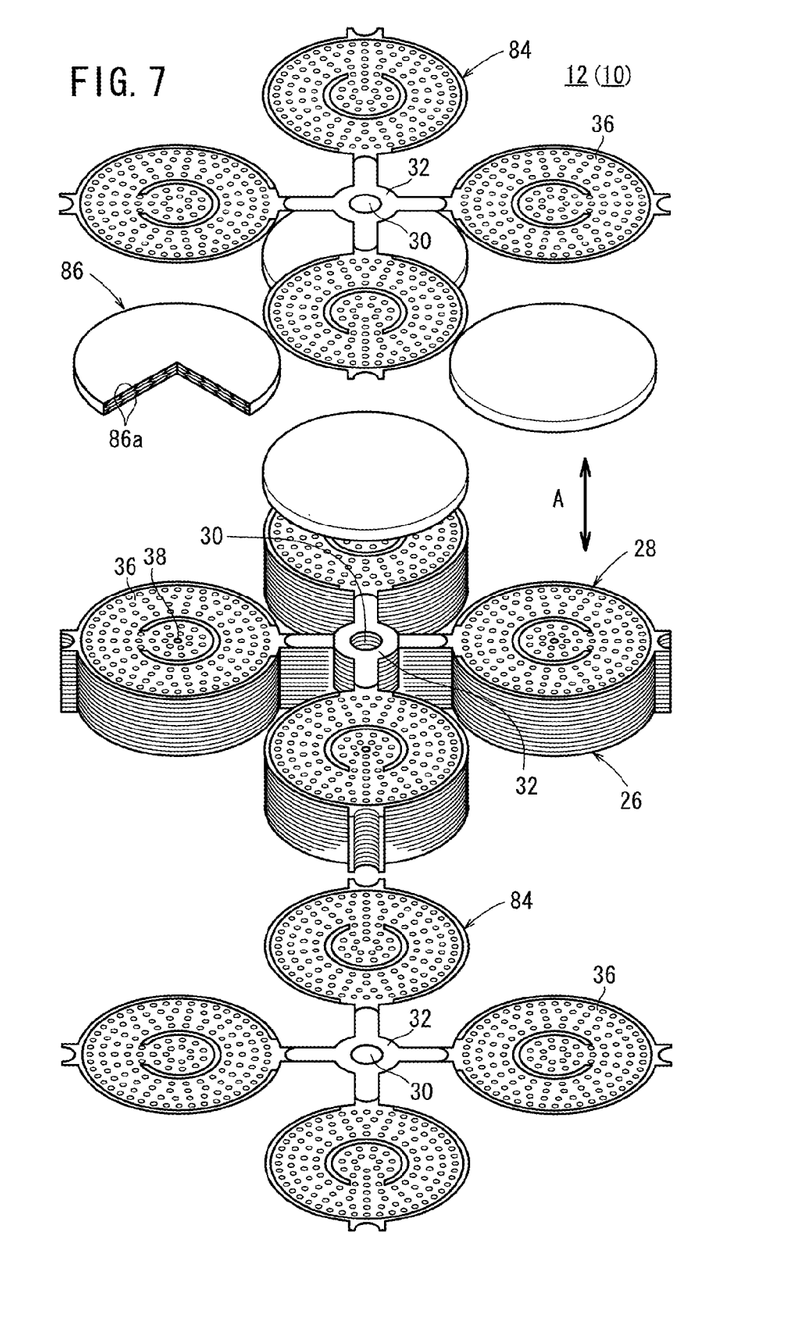
FIG. 7 is a partially exploded perspective view showing the fuel cell stack.

As shown in FIGS. 6 and 7, each of the sandwiching sections 36 has a substantially planar surface 36b which faces the cathode 22. A plate 50 having a circular disk shape is fixed to the surface 36b, e.g., by brazing, diffusion bonding, laser welding, or the like. A plurality of projections 52 are provided on the plate 50, e.g., by press forming. As shown in FIG. 6, by the projections 52, an oxygen-containing gas channel 54 for supplying an oxygen-containing gas along an electrode surface of the cathode 22 is formed on the side of the surface 36b of the sandwiching section 36. The projections 52 function as a current collector.

Extensions 56 extend from the outer circumferential positions of the respective sandwiching sections 36. The extensions 56 are used for collecting and measuring generated electrical energy from the electrolyte electrode assemblies 26, positioning the electrolyte electrode assemblies 26 to the separators 28, and detecting the number of fuel cells (see FIGS. 4 and 5).

As shown in FIG. 4, a channel member 60 is fixed to a surface of the separator 28 facing the cathode 22, e.g., by brazing, diffusion bonding, or laser welding. The channel member 60 has a planar shape. The fuel gas supply passage 30 extends through a fuel gas supply section 62 at the center thereof in the channel member 60. A predetermined number of reinforcement bosses 63 are formed in the fuel gas supply section 62.

Four second bridges 64 extend radially from the fuel gas supply section 62. Each of the second bridges 64 is fixed to the separator 28 from the first bridge 34 to the surface 36b of the sandwiching section 36 to cover the fuel gas inlet 38 (see FIG. 6).

From the fuel gas supply section 62 to the second bridge 64, a fuel gas supply channel 66 connecting the fuel gas supply passage 30 to the fuel gas inlet 38 is formed. For example, the fuel gas supply channel 66 is formed by, e.g., etching.

As shown in FIG. 6, the oxygen-containing gas channel 54 is connected to an oxygen-containing gas supply passage 68 for supplying the oxygen-containing gas from a space between an inner circumferential edge of the electrolyte electrode assembly 26 and an inner circumferential edge of the sandwiching section 36 in a direction indicated by an arrow B. The oxygen-containing gas supply passage 68 extends between the inside of the respective sandwiching sections 36 and the respective first bridges 34 in the stacking direction indicated by the arrow A.

An insulating seal 70 for sealing the fuel gas supply passage 30 is provided between the separators 28. For example, crustal component material such as mica material and ceramic material, glass material, and composite material of clay and plastic may be used for the insulating seal 70. The insulating seal 70 seals the fuel gas supply passage 30 from the electrolyte electrode assemblies 26. For the fuel cell stack 12, an exhaust gas channel 72 is provided outside (around) the sandwiching sections 36.

As shown in FIG. 4, a flow rectifier member 74 is provided in each space between the adjacent sandwiching sections 36 for rectifying the flow of the oxygen-containing gas supplied from the oxygen-containing gas supply passage 68, and flowing through the oxygen-containing gas channel 54 along the surface of each electrolyte electrode assembly 26 and rectifying the flow of the fuel gas flowing in the fuel gas channel 40 along the surface of each electrolyte electrode assembly 26. The flow rectifier member 74 is a plate having a substantially fan shape. A predetermined number of the flow rectifier members 74 are stacked in the direction indicated by the arrow A. The number of the flow rectifier members 74 in a plan view is four, corresponding to positions between the sandwiching sections 36.

The flow rectifier member 74 is formed by joining an electrically insulating member of, e.g., mica material, with silicone resin. The flow rectifier member 74 is provided along part of the outer edge of the sandwiching section 36 and part of the circumscribed circle of the separator 28. One end of the flow rectifier member 74 along the part of the sandwiching section 36 is provided near the joint positions between the sandwiching sections 36 and the first bridges 34, and an outer circumferential portion 78 as the other end of the flow rectifier member 74 form part of the circumscribed circle of the separator 28.

The one end of the flow rectifier member 74 includes a cutout 80 which is cut in a direction away from the oxygen-containing gas supply passage 68 and the fuel gas supply passage 30. Circular arc portions 82 respectively corresponding to the outer shapes of the sandwiching sections 36 are formed on both sides of the flow rectifier member 74.

Figure 8:
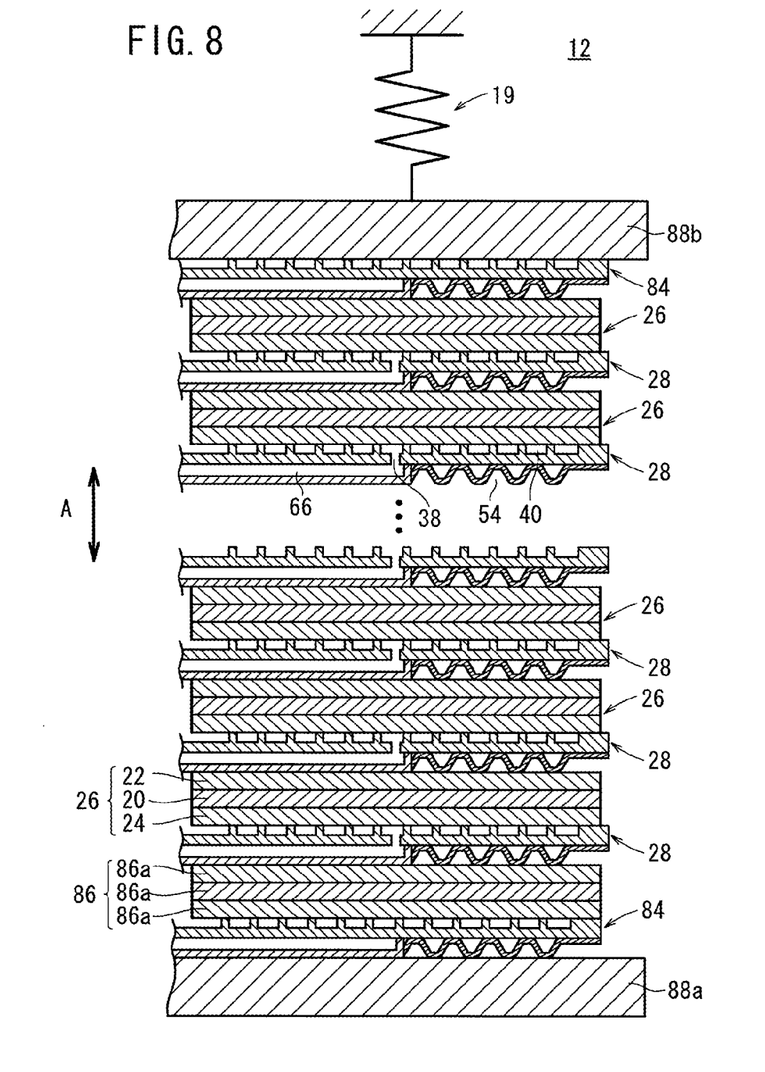
FIG. 8 is a view showing operation of assembling the fuel cell stack.

As shown in FIGS. 7 and 8, an end separator 84 is provided at one end of the fuel cell stack 12 in the direction in which the electrolyte electrode assemblies 26 and the separators 28 are stacked together (an upper end during assembling operation as shown in FIG. 8, and a lower end during the use in power generation as shown in FIG. 7). The end separator 84 is provided adjacent to the electrolyte electrode assemblies 26. The end separator 84 has structure substantially similar to that of the separator 28, and the end separator 84 is produced by eliminating the step of forming the fuel gas inlet 38 during the production process of the separator 28.

Dummy electrolyte electrode assemblies 86 and the end separator 84 are provided at the other end of the fuel cell stack 12 in the stacking direction (a lower end during assembling operation as shown in FIG. 8, and an upper end during the use in power generation as shown in FIG. 7). The end separator 84 is provided outside the dummy electrolyte electrode assemblies 86 in the stacking direction. The dummy electrolyte electrode assemblies 86 have electrical conductivity but do not have a power generation function.

The dummy electrolyte electrode assembly 86 has a shape that is similar to that of the electrolyte electrode assembly 26, i.e., has a circular disk shape. The dummy electrolyte electrode assembly 86 is a metal stack body formed by integrally stacking a plurality of flat metal plates 86a.

As shown in FIGS. 2 and 3, an end plate 88a having a substantially circular disk shape is provided at the other end of the fuel cell stack 12. The end plate 88a is provided adjacent to the end separator 84. Further, the fuel cell stack 12 includes a plurality of end plates 88b and a fixing ring 88c at the one end of the fuel cell stack 12, through a partition wall (terminal plate) 90 adjacent to the end separator 84. Each of the end plates 88b has a small diameter, and a substantially circular shape, and the fixing ring 88c has a large diameter, and a substantially ring shape. The partition wall 90 prevents diffusion of the exhaust gas to the outside of the separator 28. The number of end plates 88b is four, corresponding to the positions of stacking the electrolyte electrode assemblies 26.

The end plate 88a and the fixing ring 88c include a plurality of holes 92. Bolt insertion collar members 94 are integrally inserted into the flow rectifier member 74 in the stacking direction. Bolts 96 are inserted into the holes 92 and the bolt insertion collar members 94, and screwed into nuts 98. By the bolts 96 and the nuts 98, the end plate 88a and the fixing ring 88c are fixedly tightened together.

One fuel gas supply pipe 100, a casing 102, and one oxygen-containing gas supply pipe 104 are provided at the end plate 88a. The fuel gas supply pipe 100 is connected to the fuel gas supply passage 30. The casing 102 has a cavity 102a connected to the respective oxygen-containing gas supply passages 68. The oxygen-containing gas supply pipe 104 is connected to the casing 102, and to the cavity 102a.

A support plate member 110 is fixed to the end plate 88a through a plurality of bolts 96, nuts 106a, 106b, and plate collar members 108. A first tightening load applying unit 112 for applying a first tightening load to the fuel gas supply sections 32, 62 (gas sealing position), and second tightening load applying units 114 for applying a second tightening load to each of the electrolyte electrode assemblies 26 are provided between the support plate member 110 and the end plate 88a. The second tightening load is smaller than the first tightening load. The first tightening load applying unit 112 and the second tightening load applying units 114 form the load applying mechanism 19.

The load applying mechanism 19 is provided on the end plate 88b side, and the first tightening load applying unit 112 and the second tightening load applying unit 114 support the load in the stacking direction through the end plate 88a.

The first tightening load applying unit 112 includes a presser member 116 provided at the center of the fuel cell stack 12 (centers of the fuel gas supply sections 32, 62) for preventing leakage of the fuel gas from the fuel gas supply passage 30. The presser member 116 is provided near the center of the four end plates 88b for pressing the fuel cell stack 12.

A first spring 120 is provided at the presser member 116 through a first receiver member 118a and a second receiver member 118b. A tip end of a first presser bolt 122 contacts the second receiver member 118b. The first presser bolt 122 is screwed into a first screw hole 124 formed in the support plate member 110. The position of the first presser bolt 122 is adjustable through a first nut 126.

Each of the second tightening load applying units 114 includes a third receiver member 128a at the end plate 88b, corresponding to each of the electrolyte electrode assemblies 26. The third receiver member 128a is positioned on the end plate 88b through a pin 130. One end of a second spring 132 contacts the third receiver member 128a and the other end of the second spring 132 contacts a fourth receiver member 128b. A tip end of a second presser bolt 134 contacts the fourth receiver member 128b. The second presser bolt 134 is screwed into a second screw hole 136 formed in the support plate member 110. The position of the second presser bolt 134 is adjustable through a second nut 138.

FIG. 1 shows an orientation of the fuel cell module during the use in power generation. The casing 17 includes a first case unit 160a containing the load applying mechanism 19, and a second case unit 160b containing the fuel cell stack 12 at upper and lower positions. The joint portion between the first case unit 160a and the second case unit 160b is tightened by screws 162 and nuts 164 through the partition wall 90. The partition wall 90 functions as a gas barrier for preventing entry of the hot exhaust gas or the hot air from the fluid unit 18 into the load applying mechanism 19. An end of a ring shaped wall plate 166 is joined to the second case unit 160b, and a head plate 168 is fixed to the other end of the wall plate 166.

A fuel gas supply pipe 170 is connected to the evaporator 15. The fuel gas supply pipe 170 is connected to a raw fuel supply unit (not shown) for supplying a raw fuel (methane, ethane, propane, or the like). The outlet of the evaporator 15 is connected to the inlet of the reformer 16. An exhaust gas pipe 172 is provided adjacent to the fuel gas supply pipe 170.

An oxygen-containing gas supply pipe 174 is connected to the head plate 168, and the oxygen-containing gas supply pipe 174 extends through a channel 176 in the casing 17, and connects the heat exchanger 14 to the oxygen-containing gas supply passage 68.

Operation of the fuel cell module 10 will be described below.

As shown in FIG. 1, the air ejected from an air pump (not shown) as an oxygen-containing gas is supplied from the oxygen-containing gas supply pipe 174 to the channel 176 in the casing 17. The air is heated by the heat exchanger 14, and then, the air is supplied through the oxygen-containing gas supply pipe 104 to each of the oxygen-containing gas supply passages 68 through the cavity 102a.

A raw fuel (methane, ethane, propane or the like) is supplied from the fuel gas supply pipe 170 to the reformer 16, and water is supplied from the fuel gas supply pipe 170 to the reformer 16. The raw fuel flows through the reformer 16, and the raw fuel is reformed to produce a fuel gas (hydrogen-containing gas). The fuel gas is supplied from the fuel gas supply pipe 100 connected to the end plate 88a to the fuel gas supply passage 30.

As shown in FIG. 6, the fuel gas flows along the fuel gas supply passage 30 of the fuel cell stack 12 in the stacking direction indicated by the arrow A. The fuel gas moves through the fuel gas supply channel 66 along the surface of the separator 28.

The fuel gas flows from the fuel gas supply channel 66 into the fuel gas channel 40 through the fuel gas inlet 38 formed in the sandwiching section 36. The fuel gas inlet 38 is provided at substantially the central position of the anode 24 of each electrolyte electrode assembly 26. Thus, the fuel gas is supplied from the fuel gas inlet 38 to substantially the central region of the anode 24, and flows along the fuel gas channel 40 to the outer circumferential region of the anode 24.

Under the rectifying operation of the flow rectifier member 74, the oxygen-containing gas is supplied to the oxygen-containing gas supply passage 68, and flows into the space between the inner circumferential edge of the electrolyte electrode assembly 26 and the inner circumferential edge of the sandwiching section 36, and flows in the direction indicated by the arrow B toward the oxygen-containing gas channel 54. In the oxygen-containing gas channel 54, the oxygen-containing gas flows from the inner circumferential edge (center of the separator 28) to the outer circumferential edge (outer circumferential edge of the separator 28) of the electrolyte electrode assembly 26.

Thus, in each of the electrolyte electrode assemblies 26, the fuel gas flows from the center to the outer circumferential side on the electrode surface of the anode 24, and the oxygen-containing gas flows in one direction indicated by the arrow B on the electrode surface of the cathode 22. At this time, oxide ions move through the electrolyte 20 toward the anode 24 for generating electricity by chemical reactions.

The exhaust gas chiefly containing the air after partial consumption in the power generation reaction is discharged to the outer circumferential region of each of the electrolyte electrode assemblies 26, and flows through the exhaust gas channels 72 as the off gas, and the off gas is discharged from the fuel cell stack 12 (see FIG. 1).

In the first embodiment, as shown in FIG. 8, the end plate 88a is provided at the lowermost position during the assembling operation of the fuel cell stack 12, and the fluid unit 18 is provided at the end plate 88a. Firstly, the end separator 84 is disposed on the end plate 88a.

Then, the four dummy electrolyte electrode assemblies 86 are provided on the end separator 84 at positions corresponding to the sandwiching sections 36. Further, the separator 28 is placed on the dummy electrolyte electrode assemblies 86 such that each oxygen-containing gas channel 54 is oriented toward the dummy electrolyte electrode assemblies 86.

Then, the four electrolyte electrode assemblies 26 are provided on the separator 28 at positions corresponding to the dummy electrolyte electrode assemblies 86. Then, the separators 28 and the electrolyte electrode assemblies 26 are provided alternately in the vertical direction upwardly.

Then, during the assembling operation, after the electrolyte electrode assemblies 26 at the uppermost position in the vertical direction are placed, the end separator 84 is placed on the electrolyte electrode assemblies 26. The end plate 88b is stacked on the end separator 84, and the load applying mechanism 19 is stacked on the end plate 88b.

As described above, the end separator 84 is provided at the other end of the fuel cell stack 12 in the stacking direction (lower end during the assembling operation), and the end separator 84 limits the supply of the fuel gas to the fuel gas channel 40. Further, the end separator 84 is provided at one end of the fuel cell stack 12 in the stacking direction (upper end during the assembling operation), and the end separator 84 limits the supply of the fuel gas to the fuel gas channel 40.

In the structure, the fuel gas is not wastefully supplied from the fuel gas channel 40 to the dummy electrolyte electrode assemblies 86 and the end plates 88a, 88b. Consumption of the fuel gas is reduced, and the fuel gas can be supplied efficiently.

Further, the dummy electrolyte electrode assemblies 86 are provided adjacent to the end separator 84 at the other end of the fuel cell stack 12 in the stacking direction. In the structure, by the load absorption function of both the end separator 84 and the dummy electrolyte electrode assemblies 86 provided at the lowermost position during the assembling operation of the fuel cell stack 12, the load in the stacking direction (weights of the separators 28 and the electrolyte electrode assemblies 26) are absorbed suitably, and the damages or the like of the electrolyte electrode assemblies 26 can be prevented.

Further, the fuel gas inlet 38 for supplying the fuel gas to the fuel gas channel 40 is formed in the separator 28, but the fuel gas inlet 38 is not formed in the end separator 84. In this respect, the end separator 84 is different from the separator 28. In the structure, the end separator 84 can be produced in the same manner as the separator 28, simply by eliminating the process of forming the fuel gas inlet 38. Thus, the production cost can be reduced suitably.

Further, the fuel gas is not unnecessarily discharged from the end separator 84 that is not used for power generation. Therefore, wasteful consumption of the fuel gas can be prevented effectively.

Further, the dummy electrolyte electrode assemblies 86 are provided instead of the electrolyte electrode assembly 26 at the other end of the fuel cell stack 12 in the stacking direction. Thus, a heat insulating layer is formed between the dummy electrolyte electrode assemblies 86 and the end separator 84, thereby improving the heat insulating performance in the fuel cell stack 12.

Further, at the one end of the fuel cell stack 12 in the stacking direction, the end separator 84 has the fuel gas channel 40 that is positioned at the extreme end of the fuel cell stack 12 in the stacking direction, i.e., the fuel gas channel 40 is oriented toward the end plate 88b. At the other end of the fuel cell stack 12 in the stacking direction, the end separator 84 has the oxygen-containing gas channel 54 that is positioned at the extreme end of the fuel cell stack 12 in the stacking direction, i.e., the oxygen-containing gas channel 54 is oriented toward the end plate 88a.

In the structure, no electrolyte electrode assemblies 26 are provided outside the end separators 84 in the stacking direction. For example, by providing the end separator 84 on the lower side during assembling or during operating, buckling and damages of the electrolyte electrode assemblies 26 can be prevented. Moreover, since the fuel gas is not wastefully supplied to the extreme end of the fuel cell stack 12, consumption of the fuel gas is reduced, and power generation operation can be performed efficiently.

Further, the dummy electrolyte electrode assembly 86 is the metal stack body formed by integrally stacking the plurality of flat metal plates 86a. In the structure, in the fuel cell stack 12, the electrical energy produced in the power generation can be transmitted efficiently, and the load in the stacking direction is absorbed. Further, buckling or damages of the electrolyte electrode assemblies 26 can be prevented.

Further, at the time of stacking components of the fuel cell stack 12, the end separator 84 at the other end and the dummy electrolyte electrode assemblies 86 are provided on the lower side (see FIG. 8), and during power generation of the fuel cell stack 12, as shown in FIG. 1, the end separator 84 at the one end is provided on the lower side. In this manner, at both ends of the fuel cell stack 12, deformation, buckling or the like of the electrolyte electrode assemblies 26 and the separators 28 can be prevented, and the durability of the fuel cell stack 12 is improved suitably.

Further, in the fuel cell stack 12, the load applying mechanism 19 for applying the load to the fuel cell stack 12 in the stacking direction is provided adjacent to the end separator 84. Further, the fluid unit 18 having the reformer 16 for producing the fuel gas supplied to the fuel cell stack 12 and the heat exchanger 14 is provided adjacent to the dummy electrolyte electrode assemblies 86. In the structure, the overall size of the fuel cell module 10 is reduced easily, and the load in the stacking direction can be transmitted efficiently. Further, heat distortion can be suppressed suitably.

Moreover, the load applying mechanism 19 and the fluid unit 18 are provided symmetrically with respect to the axis of the fuel cell stack 12. In the structure, occurrence of the heat distortion can be suppressed as much as possible.

Figure 9:
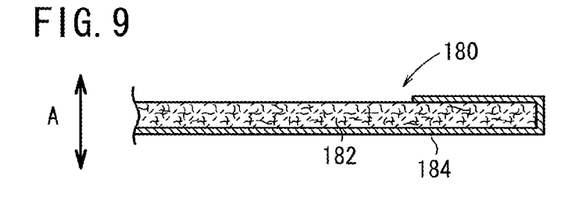
FIG. 9 is a cross sectional view showing a dummy electrolyte electrode assembly of a fuel cell module according to a second embodiment of the present invention.

FIG. 9 is a cross sectional view showing a dummy electrolyte electrode assembly 180 of a fuel cell module according to a second embodiment of the present invention.

The dummy electrolyte electrode assembly 180 is a stack body formed by stacking a ceramic felt 182 and an electrically conductive metal plate 184 together. The metal plate 184 is folded at an end of the felt 182 to protrude along both surfaces of the felt 182.

In the case of using the dummy electrolyte electrode assembly 180, the same advantages as in the case of the first embodiment are obtained. Further, improvement in the heat insulating performance is achieved easily by the ceramic felt 182.

In the first and second embodiments, the function to absorb the load in the stacking direction is provided to prevent buckling or the like of the electrolyte electrode assemblies 26. However, in order to maintain the rigidity, the load should not be absorbed excessively to a state where the load in the stacking direction is not sufficiently applied to the fuel cell stack 12.

The invention claimed is:

1. A fuel cell module comprising a fuel cell stack formed by stacking electrolyte electrode assemblies and separators alternately in a stacking direction, the electrolyte electrode assemblies each including an anode, a cathode, and an electrolyte interposed between the anode and the cathode, a fuel gas channel for supplying a fuel gas along an electrode surface of the anode being formed on one surface of the separator and an oxygen-containing gas channel for supplying an oxygen-containing gas along an electrode surface of the cathode being formed on the other surface of the separator, wherein the electrolyte electrode assembly and a first end separator are provided at one end of the fuel cell stack in the stacking direction, the first end separator being provided outside the electrolyte electrode assembly in the stacking direction, the first end separator being configured to limit supply of the fuel gas to the fuel gas channel and to allow supply of the oxygen-containing gas to the oxygen-containing gas channel;

a dummy electrolyte electrode assembly and a second end separator are provided at another end of the fuel cell stack in the stacking direction, the second end separator being provided outside the dummy electrolyte electrode assembly in the stacking direction, the dummy electrolyte electrode assembly having a shape of the electrolyte electrode assembly, having electrical conductivity, but not having a power generation function, wherein the dummy electrolyte electrode assembly is a metal stack body formed by stacking a plurality of metal plates, including an electrically conductive metal plate, and a ceramic felt.

2. The fuel cell module according to claim 1, wherein a fuel gas inlet for supplying the fuel gas into the fuel gas channel is formed in the separator; and the fuel gas inlet is not formed in the first end separator.

3. The fuel cell module according to claim 1, wherein the first end separator is provided at the one end in the stacking direction such that the fuel gas channel is positioned at the extreme end of the fuel cell stack in the stacking direction; and the second end separator is provided at the other end in the stacking direction such that the oxygen-containing gas channel is positioned at the extreme end of the fuel cell stack in the stacking direction.

4. The fuel cell module according to claim 1, wherein during power generation of the fuel cell stack, the one end of the fuel cell stack in the stacking direction is positioned on a lower side.

5. The fuel cell module according to claim 1, wherein a load applying mechanism is provided adjacent to the second end separator at the one end of the fuel cell stack in the stacking direction, for applying a load to the fuel cell stack in the stacking direction; and a fluid unit is provided adjacent to the other end of the fuel cell stack in the stacking direction, and includes a reformer for producing the fuel gas to be supplied to the fuel cell stack and a heat exchanger for performing heat exchange between an exhaust gas discharged from the fuel cell stack and the oxygen-containing gas.

6. The fuel cell module according to claim 5, wherein the load applying mechanism and the fluid unit are provided symmetrically with respect to an axis of the fuel cell stack.

* * * * *